United States Patent Office 3,203,258
Patented Aug. 31, 1965

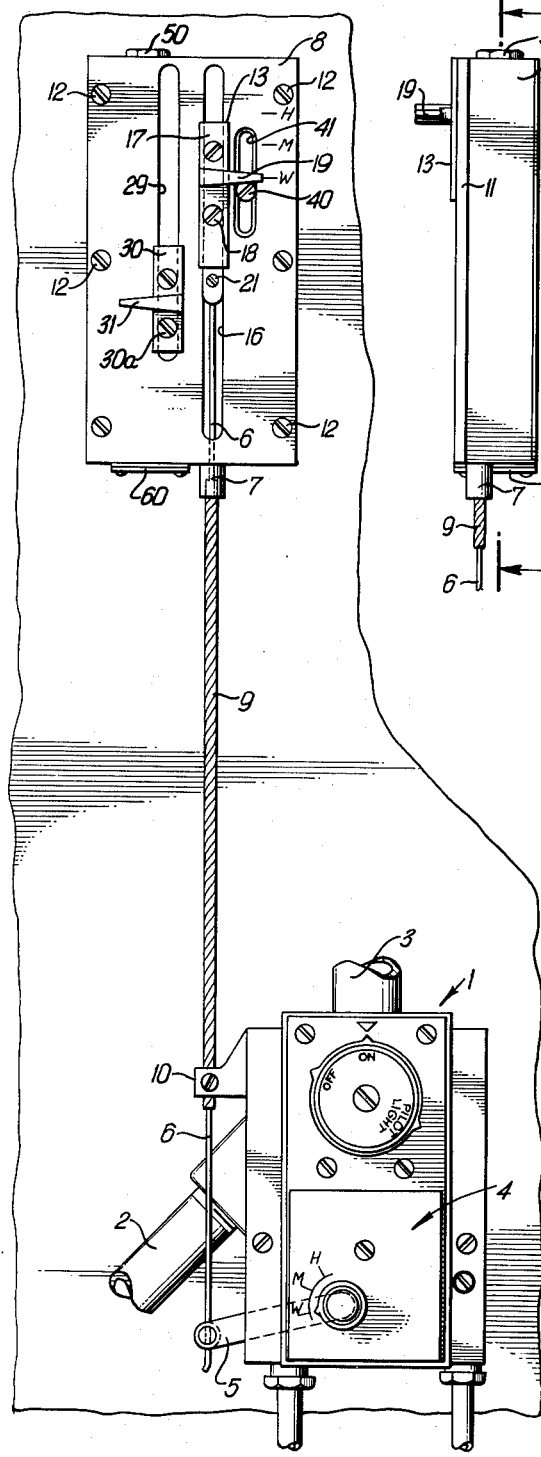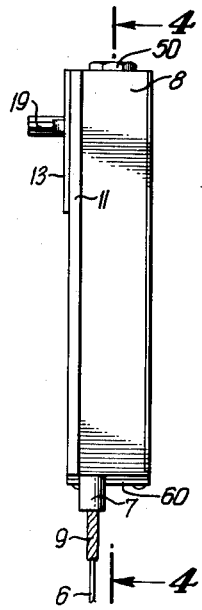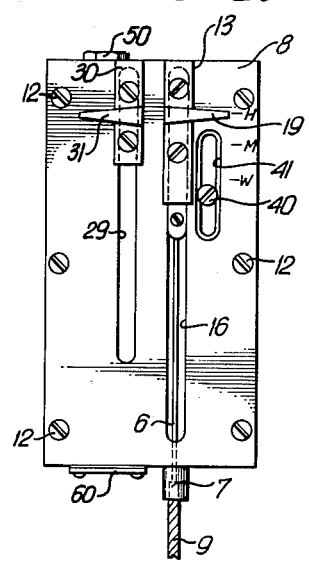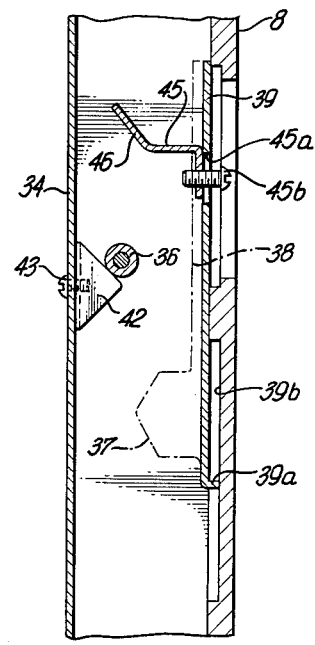
Aug. 31, 1965   R. D. GRAYSON   3,203,258
CONTROL DEVICE FOR TEMPORARILY ALTERING THE TEMPERATURE SETTING OF A THERMOSTAT
Original Filed Oct. 14, 1960   4 Sheets-Sheet 1
FIG. 1.   FIG. 3.   FIG. 2.
FIG. 14.
INVENTOR.
RICHARD D. GRAYSON
BY
Flam and Flam
ATTORNEYS.

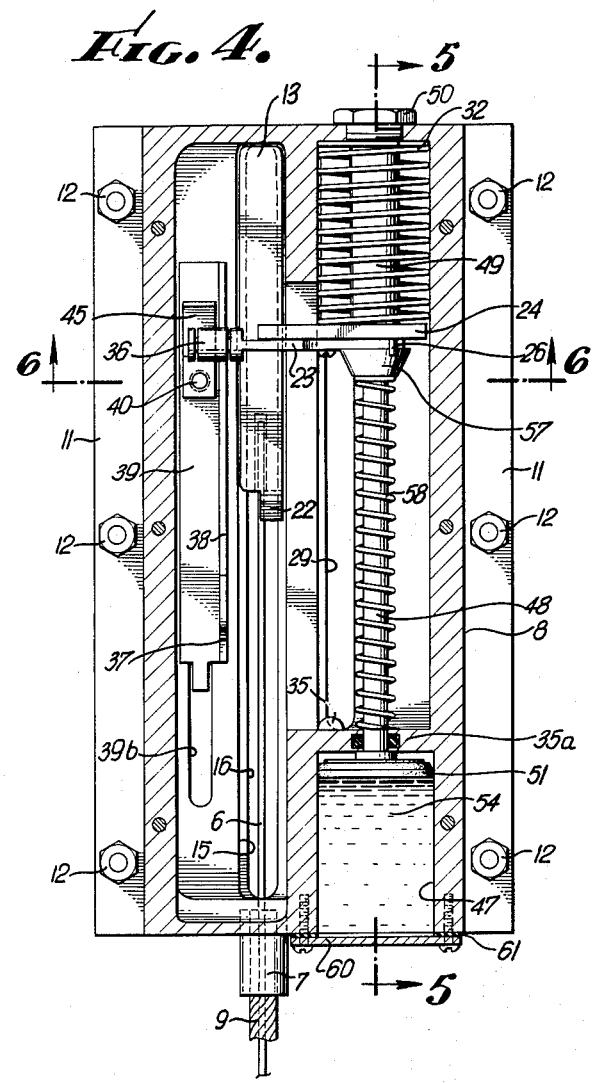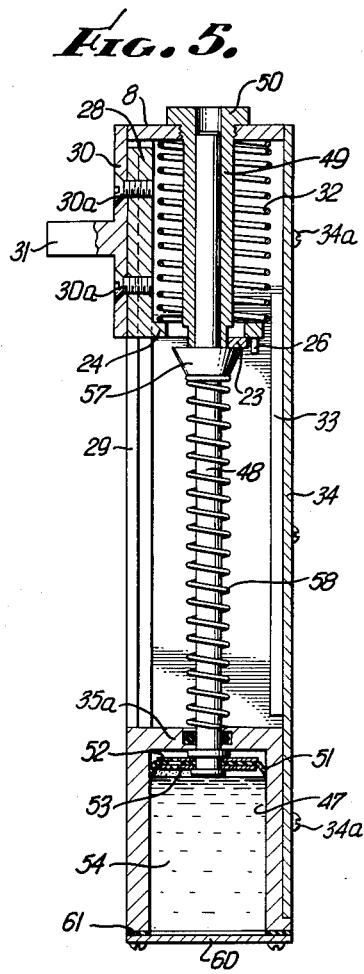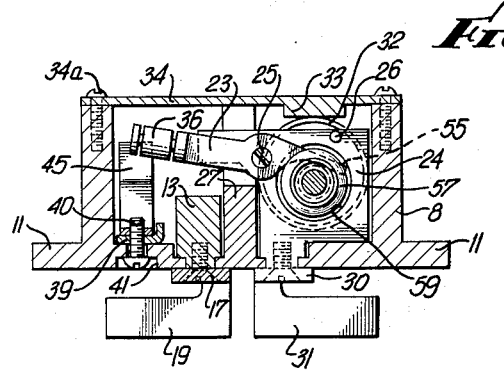

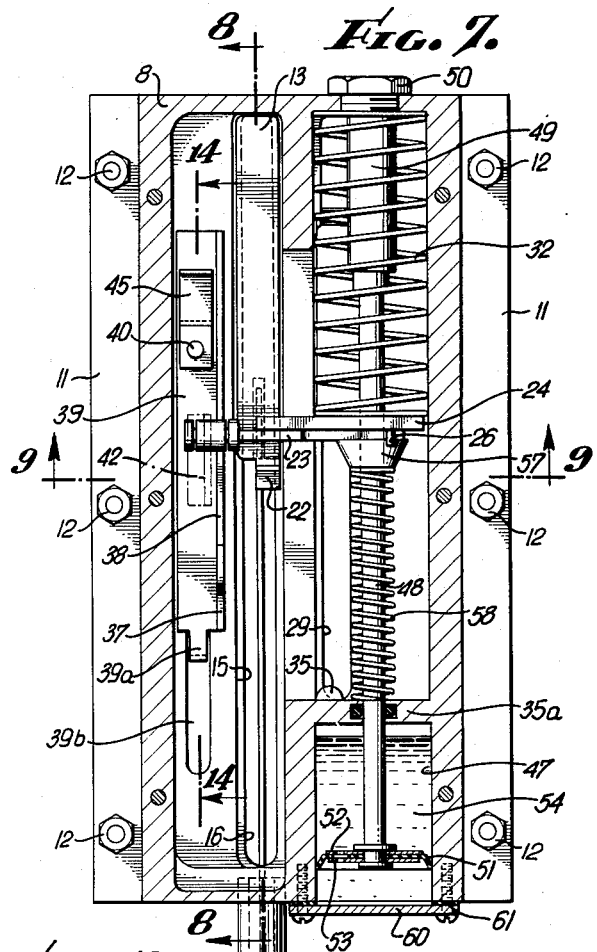
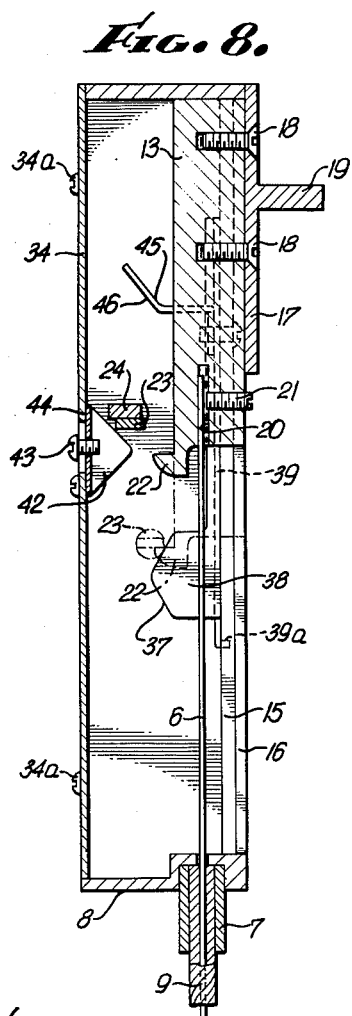
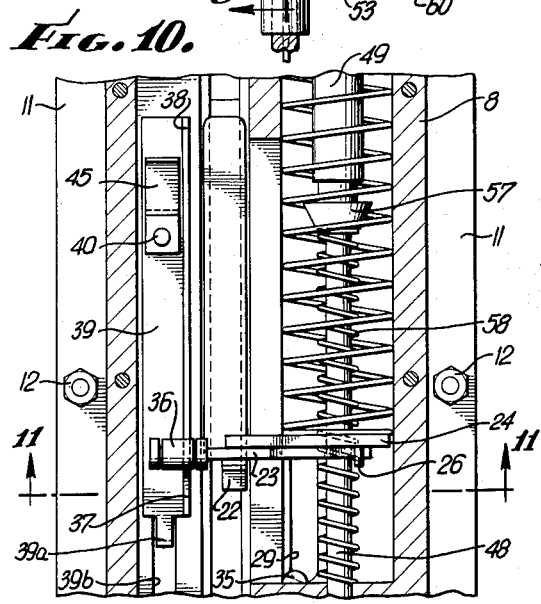
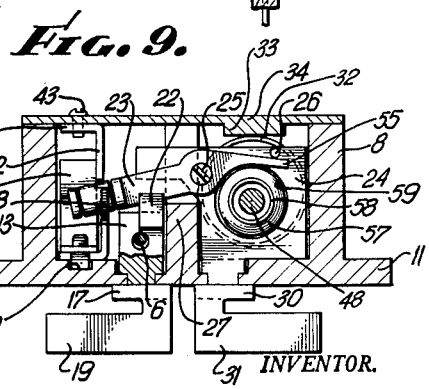
INVENTOR.
RICHARD D. GRAYSON
BY
Flam and Flam
ATTORNEYS.

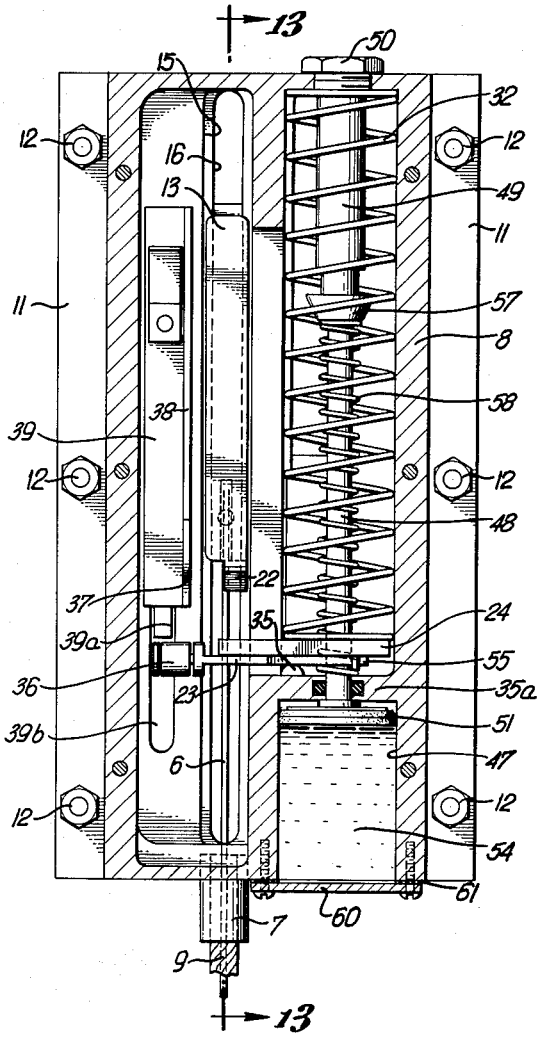
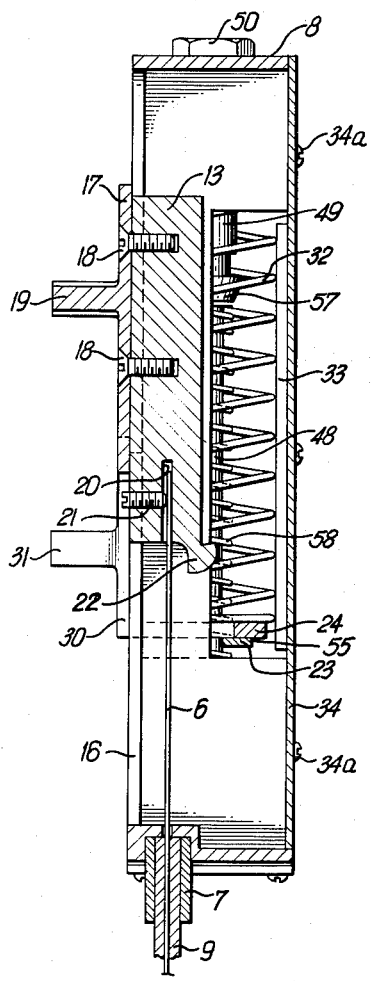
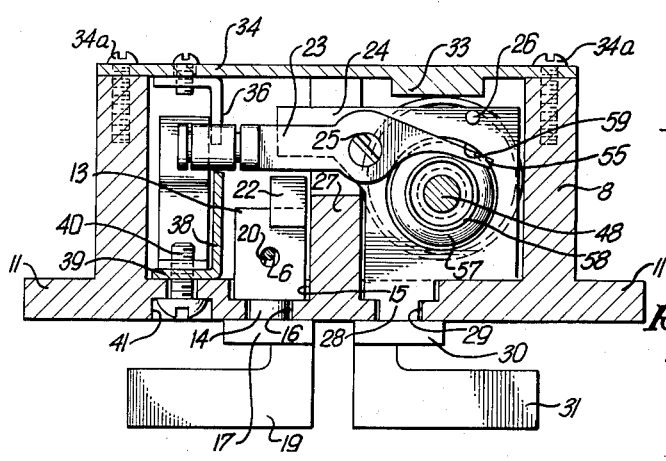
INVENTOR.
RICHARD D. GRAYSON
BY
Flam and Flam
ATTORNEYS.

3,203,258
CONTROL DEVICE FOR TEMPORARILY ALTERING THE TEMPERATURE SETTING OF A THERMOSTAT
Richard D. Grayson, La Canada, Calif., assignor, by mesne assignments, to International Telephone and Telegraph Corporation, New York, N.Y., a corporation of Maryland
Continuation of application Ser. No. 62,641, Oct. 14, 1960. This application Apr. 1, 1963, Ser. No. 270,500
10 Claims. (Cl. 74—3.5)

This application is a continuation of my prior application Serial No. 62,641, filed October 14, 1960, now abandoned, and entitled "Control Device for Temporarily Altering the Temperature Setting of a Thermostat."

This invention relates to the thermostatic control for a water heater or the like.

Domestic water heaters universally include a tank, a heating unit (using gaseous or liquid fuel or electric energy), and an adjustable thermostat that serves to control the temperature of the water.

The hot water is used in a home for a variety of purposes, such as dishwashing, bathing, washing, and for laundering clothes. It is practical to set the thermostat to obtain the proper temperature or near it for use in connection with any of a number of uses; but when a hotter temperature is desired, as for laundering, the normal setting is not usable.

Manual adjustment of the thermostat may be effected for increasing the water temperature, and then for returning the temperature to normal after the laundry requirements are met. There is, however, a likelihood that the readjustment to the lower normal temperature may be overlooked.

It is one of the objects of this invention to make it possible automatically to return the thermostat to its normal setting after the need for a higher temperature is past.

It is another object of this invention to make it possible to preset the thermostat to any desired higher temperature than normal, within the limits of adjustment, with the assurance that the thermostat setting will be returned to normal after a predetermined time interval.

It is another object of this invention to provide a compact apparatus for performing these controlling functions, and capable of simple manipulation.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of the invention is best defined by the appended claims.

Referring to the drawings:

FIGURE 1 is a front elevation of a control apparatus incorporating the invention, the control elements being in normal operating position;

FIG. 2 is a fragmentary view similar to FIG. 1, but illustrating the setting of the apparatus for increasing the temperature attained in a water heater or the like for a specified period;

FIG. 3 is a side elevation of the apparatus shown in FIG. 2, taken from the right-hand side of FIG. 2;

FIG. 4 is an enlarged sectional view, taken along a plane corresponding to line 4—4 of FIG. 3;

FIG. 5 is an enlarged sectional view, taken along a plane corresponding to line 5—5 of FIG. 4;

FIG. 6 is a transverse sectional view, taken along a plane corresponding to line 6—6 of FIG. 4;

FIG. 7 is a view similar to FIG. 4, but illustrating the position of the parts just prior to the conclusion of the timing operation;

FIG. 8 is a sectional view, taken along a plane corresponding to line 8—8 of FIG. 7;

FIG. 9 is a sectional view, taken along a plane corresponding to line 9—9 of FIG. 7;

FIG. 10 is a fragmentary enlarged sectional view, similar to FIG. 7, but illustrating a later stage of the cycle of operation of the device;

FIG. 11 is a sectional view, taken alonog a plane corresponding to line 11—11 of FIG. 10;

FIG. 12 is a sectional view, similar to FIG. 7, but illustrating the completion of the cycle;

FIG. 13 is a sectional view, taken along a plane corresponding to line 13—13 of FIG. 12; and FIG. 14 is a sectional view, taken along a plane corresponding to line 14—14 of FIG. 7.

In FIG. 1 there is shown a valve structure 1 having a gas inlet conduit 2 and a gas outlet conduit 3. This valve may be of any convenient form and includes the usual safety controls.

A thermostat structure 4 is indicated generally on the lower portion of the valve casing. This thermostat structure has an adjustable arm 5, by the aid of which the temperature of a space or the water in a hot water heater may be controlled in a well-understood manner.

In the present instance, the setting of the thermostat arm 5 is remotely effected by the aid of a wire or cable connection 6. In the present instance, the connection 6 extends through a guide sleeve 7 (FIG. 8). This guide sleeve 7 is firmly fixed to the bottom wall of a casing 8. Carried firmly within the sleeve is the upper end of a flexible conduit 9 through which the connection 6 is passed downwardly to be connected to the arm 5. The lower end of the flexible conduit 9 is firmly fixed within a bracket 10 mounted upon the valve structure 1.

The casing 8 has longitudinal flanges 11 at each side of the casing (see particularly FIG. 11). By the aid of these flanges, the casing 8 may be supported upon an appropriate wall surface, as by the aid of the bolts 12 (FIG. 12).

The upper end of the connection 6 is clamped in a manually adjustable member or slide 13. This is accomplished by the aid of a clamping screw 21 (FIG. 13) extending into an aperture 20 in slide 13, into which aperture the top of connection 6 extends. This slide 13 is provided with a rear portion 14 of reduced width (FIG. 11). The slide 13 is guided by the groove 15 (FIGS. 11 and 12), and the reduced portion 14 is similarly guided in a groove 16. These grooves or slots extend longitudinally in the front wall of the casing 8 (FIGS. 1 and 2).

Attached to the reduced portion 14 is a front plate 17 extending over the slot 16, as by the aid of screws 18 (FIG. 1). This front plate overlaps the slot 16 so as to maintain the slide 13 in proper position in the slots 15 and 16.

As shown most clearly in FIG. 13, the plate 17 is provided with an integral knob 19 by the aid of which the slide 13 may be manually manipulated.

As indicated in FIG. 1, the connection 6 may be manipulated by the aid of knob 19 to move the slide or adjustable control member 13 toward the top of the casing 8. Such an adjustment is illustrated in FIG. 2. Under such circumstances, the setting of the thermostat structure 4 is at a high temperature level. The connection 6 and the lever 5 are so arranged that they maintain adjustment of member 13 without any special provisions.

The arrangement is such that this setting at a high level may persist for a specified time interval, corresponding to a time delay, after which the slide 13 will be returned to its normal position of FIG. 1. The downward movement of the adjustable member 13 may be effected by the aid of a lower hook extension 22 formed integrally with the member 13 (FIGS. 8 and 13).

The means engaging the hook member 22 to return slide 13 to the position of FIG. 1 is a coupling arm or actuator 23 pivotally mounted on a movable reset member or plate 24 (FIGS. 4, 7, 9, 10, 11 and 12). Referring particularly to FIG. 8, 9 and 11, the arm 23 is pivoted by the aid of a pivot screw 25 threaded into plate 24. When it is in the position of FIG. 9, it can engage the hook 22 of slide 13 for moving the slide. The plate 24 carries a stop pin 26 to determine the position of the arm or actuator 23 when it is urged in a counterclockwise direction to the position of FIG. 9.

Movement of the arm 23 in a downward direction, as viewed in FIG. 7, is effected by vertical movement of the plate 24. For this purpose, the plate 24 is guided by one of the exterior walls of the casing 8 (FIGS. 9 and 11) and an intermediate partition 27. The plate 24 has an integral stepped vertical portion 28 (FIGS. 5 and 11) guided in a stepped groove 29 in the front wall of casing 8. Attached to this extension 28 is a covering plate 30 which carries a knob 31 (see also FIG. 5). The covering plate 30 is wider than slot 29 to maintain the plate 24 in proper guided position. Screws 30a hold the covering plate 30 to the vertical portion 28 of plate 24.

The plate 24 is urged downwardly from the position of FIG. 5 by a strong compression spring 32. This spring is confined between the exterior wall of the casing 8 and the intermediate wall 27, as well as by a thickened portion 33 of removable cover member 34. This cover is held in place by screws 34a (FIG. 11). The cover downward movement is limited by a resilient bumper 35 (FIG. 12) attached to the top surface of a wall 35a that extends across the left-hand portion (FIG. 12) of casing 8 and above the bottom wall.

At the beginning of a cycle for predetermining a period when the adjusting member 13 remains at the extreme upper end of the casing 8 as shown in FIG. 7, the knob or handle 19 is first moved to the position of FIG. 2. Then the knob 31 is also moved upwardy to cause spring 32 to be fully compressed, as shown in FIGS. 4 and 5.

In this upward movement, the arm 23 is angularly moved so as to cause it to be properly positioned in the path of the hook 22 when it moves downwardly past member 13.

Thus, considering the lowermost position of the plate 24 as viewed in FIG. 12, the beginning of the upward movement of the plate 24 by operation of the knob or handle 31 causes a cam follower roller 36 to engage the sloping surface 37 of a cam plate 38 (see also FIGS. 7 and 8). This cam plate 38 is shown in phantom lines in FIG. 14. It is carried by a flat plate 39 formed integrally therewith (see also FIG. 11). This plate 39 carries a screw 40 extending through a slot 41 to the right of the slot 16 in which the adjustable member 13 is accommodated (FIGS. 1 and 11). The head of the screw 40 overlaps the side of the slot and forms a means for adjusting the position of the cam plate 39. The plate 39 has a lower narrow extension 39a (FIG. 14) engaging in slot 39b on the inner surface of the wall of casing 8. In this way, the plate 39 is kept in accurate vertical alignment. The position of cam plate 39 determines the normal position of adjustable member 13, and therefore the normal temperature attained by the hot water. How the cam 37 causes this member 13 to remain at the normal setting will be hereinafter described.

Now when the roller 36 in its upward or "setting" movement passes the crest of the cam 38, the arm 23 is moved from the position of FIG. 9 to the horizontal position of FIG. 11. In this raised position, the arm 23 passes over the hook 22 and is again moved downwardly to the position of FIG. 9 by the aid of a cam member 42 (FIG. 8) carried on the inside surface of the cover member 34 (FIGS. 8, 11 and 14). The cam member 42 is held in place by the aid of a screw 43 engaging a leg 44 of the cam member 42.

Further continued upward movement of the arm 23, by the aid of the knob 31, causes the arm 23 again to be raised about its pivot screw 25 so as to cause the arm to be coupled to a timing device which slowly returns the arm 23 to a time-terminating position. For this purpose, the plate 39 carries a supplemental cam member 45 (see particularly FIG. 14). The cam member 45 has a sloping surface 46 adapted to contact the roller 36 and to lift it toward the cover member 34. The position of the cam member 45 is adjustable with respect to the plate 39 by the aid of the slot 45a in the plate 39 through which the screw 45b passes. This screw serves additionally to attach cam member 45 to the plate 39. The position of arm 23 upon completion of the action of cam member 45 is shown in FIG. 6.

The plate 24 is urged downwardly by the spring 32, but it is restrained against rapid movement under the influence of the spring 32 by a timer arrangement including a dash pot structure. This dash pot structure is illustrated in FIGS. 4, 5, 7 and 12. It includes a cylinder 47 formed as a bore within the body of the casing 8. Its upper wall is formed by wall 35a hereinbefore mentioned. Its lower wall is formed by a cover 60 at the bottom of the cylinder space 47. A gasket 61 may be interposed between the cover 60 and the lower surface of casing 8.

The upper wall 35a has an opening at the top for the accommodation of a long stem 48. The upper end of the stem is guided in a sleeve 49 (see particularly FIG. 5) having a threaded upper portion, as shown in FIG. 5 and capped by a hexagon 50 by the aid of which it may be threaded into the top wall of the casing 8.

The stem 48 at its lower end carries the usual piston structure, including the leather cup 51 reinforced by the washers 52 and 53. A small vent extends through the three elements 51, 52 and 53. The space 47 is filled with a dash pot oil 54. Accordingly, the lowering of the stem 48 is restrained or retarded by the action of the dash pot.

The stem 48 is so arranged that it is coupled to the plate 24 when the plate 24 is moved to the upper position illustrated in FIG. 4. In this position, the cam 45 has moved the arm 23 to a position where its right-hand end 55 engages the upper surface of a collar 57 carried by the stem 48. In FIG. 6 the right-hand arm 55 engages the top surface of collar 57, which is urged against the lower end of sleeve 49. The collar 57 is large enough to overlap the sleeve 49. When the top of collar 57 is thus engaged by arm 55, the plate 24 is thus caused to move the collar 57 against the action of the dash pot device.

The stem is gradually lowered under the influence of the strong spring 32 against the time delay device formed by the dash pot. The stem 48 accordingly slowly descends. The descent continues until the roller 36 passes the cam element 42 (FIG. 8), which causes the arm 23 to take the position of FIG. 9. In this positon, the latching arm 55 is released from collar 57. The spring 32 now is free of the dash pot stem 48 to urge the arm 23 and the plate 24 rapidly downwardly. Since the arm 23 is in the position of FIG. 9, this arm can now engage the hook 22 for moving the adjustable member 13 downwardly.

Under such circumstances, the heavy spring 32 moves the arm 23 rapidly into contact with the hook 22. FIG. 7 illustrates the positon just before hook 22 is engaged. Thereafter, the adjustable member 13 is moved downwardly to the phantom-line position of FIG. 8. At this time, the roller 36 engages the sloping cam 37, lifting the arm 23 out of operative cooperation with the hook 22. The arm 23 and the plate 24 continue their downward movement under the influence of spring 32 until the position of FIG. 12 is reached. The handles or knobs 19 and 31 reach the positions indicated in FIG. 1, corresponding to return of the adjustable member 13 to the normal position and a corresponding return of the thermostat arm 5.

Just as soon as the plate 23 is released from collar 57 mounted on the stem 48, a relatively weak spring 58 urges the collar upwardly so as to engage the lower surface of the sleeve 49. The plate 24 has an aperture 59 large enough to permit the upward movement of the collar 57 in this manner so that the collar 57 does not carry the plate 24 with it in this return movement.

By adjustment of the cam plate 38 (FIG. 14) as permitted by the slot 41, the vertical position of the slide 13 at which the arm 23 is disconnected therefrom is correspondingly adjusted. Hence the normal low setting of the thermostat is thus determined.

In order to initiate the operation of the mechanism to effect the temporary high setting, both handles 19 and 31 are moved to the upper position of FIG. 2. In this position, the right-hand portion 55 of arm 23 is in engagement with the top of the collar 57 by virtue of the operation of the cam 45. This is illustrated in FIG. 4.

Now the stem 48 slowly descends until the roller 36 passes over the cam member 42, releasing the arm 55 from the top of collar 57. The compression spring 32 then moves the arm 23 downwardly to cause it to engage the hook 22 and to move the slidably adjsutable member 13 to its initial position corresponding to the time when the roller 36 passes over the crest of the cam member 28, releasing arm 23 from hook 22. The thermostat 4 is thus reset to its original low temperature position.

The inventor claims:

1. In control apparatus for a thermostat: a control member manually movable to determine the temperature setting of the thermostat; a reset member movable in a path; means biasing the reset member to move in one direction toward one end of its path; a timer; latching means for releasably restraining the reset member at the other end of its path in response to movement of the reset member in the opposite direction to the said other path end; means for initiating operation of the timer in response to movement of said reset member to the said other path end; means operated by the timer after a selected time interval for releasing said latching means; a one-way driving connection between the reset member and the control member operable upon movement of the reset member toward said one path end to return said control member to a preselected setting; said timer including a member slowly movable in a path substantially parallel to that of said reset member; said latching means comprising an arm pivoted to said reset member and capable of angular movement to one position to couple the timer member to the reset member for movement of the timer member with the reset member upon movement of the reset member in said one direction; said releasing means comprising a cam so positioned as to move the arm away from its said one position in response to predetermined movement with the said timer member; said one way driving connection being effected by an arm pivoted to said reset member and movable to one position in which the said control member is in the course of movement of said arm with said reset member toward said one path end; and cam means for moving said last named arm away from engagement with said control member prior to arrival of said reset member to said one path end.

2. In control apparatus for a thermostat: a control member manually movable to determine the temperature setting of the thermostat; a reset member movable in a path; means biasing the reset member to move in one direction toward one end of its path; a timer; latching means for releasably restraining the reset member at the other end of its path in response to movement of the reset member in the opposite direction to the said other path end; means for initiating operation of the timer in response to movement of said reset member to the said other path end; means operated by the timer after a selected time interval for releasing said latching means; a one-way driving connection between the reset member and the control member operable upon movement of the reset member toward said one path end to return said control member to a preselected setting; said timer including a member slowly movable in a path substantially parallel to that of said reset member; said latching means comprising an arm pivoted to said reset member and capable of angular movement to one position to couple the timer member to the reset member for movement of the timer member with the reset member upon movement of the reset member in said one direction; said releasing means comprising a cam so positioned as to move the arm away from its said one position in response to predetermined movement with the said timer member; said one way driving connection being effected by said arm when moved away from said one position; and cam means for moving the arm away from engagement with said control member prior to arrival of said reset member to said one path end.

3. In a control device for a thermostat having a high temperature position and a normal temperature position: an adjustable member for altering at will the setting of a thermostat from a normal temperature to a higher temperature; a pivoted member, movable to actuate said adjustable member; a first spring urging said pivoted member in a direction to move said adjustable member in a direction to return the adjustable member to normal position; a timer having a collar engageable with one end of the pivoted member to couple said first spring to the collar for urging the collar in said one direction; a time delay device for retarding the motion of said collar and consequently of the pivoted member; first cam means for moving the pivoted member about its pivot so as to move the said end into coupling engagement with the collar; second cam means for moving the pivoted member so as to release said pivotal member from said collar and effective upon definite movement of the timer collar; said second cam means serving to move the pivoted member into engaging position with the adjustable member; said first spring when the coupling is released serving to urge the pivoted member to move the adjustable member to its normal position; third cam means acting on the pivoted member to move the pivoted member out of operation engagement with the adjustable member when the adjustable member attains its normal position; and second spring means active upon the collar to return the collar to initial position.

4. The combination as set forth in claim 3, in which the first spring encompasses the second spring and moves the pivoted member to an inactive position.

5. The combination as set forth in claim 3, in which the adjustable member is slidable in a guiding groove, and includes a manual adjusting knob exterior of the groove; and with the addition of a knob extending through a groove and connected to the pivoted member for moving the pivoted member in a direction to cause the first cam means to move the pivoted member into coupling engagement with the collar.

6. In a control device for a thermostat having a high temperature position and a normal temperature position: an adjustable member for altering at will the setting of a thermostat from a normal temperature to a higher temperature; a pivoted arm having one position in which said arm is capable of engaging the adjustable member to return it to normal setting condition, and having another position; a time delay device engageable with the pivoted arm for causing the arm to move toward the said one position when it is in a position out of operative relation to the adjustable member; said time delay device including a dashpot and a spring urging the arm in a direction to move the adjustable member; and means operating on the arm upon reaching a definite position for moving the arm into said one position and to disconnect the arm from the dashpot to permit the spring to move the arm to return the adjustable member to normal position.

7. In a control device for a thermostat having a high temperature position and a normal temperature position: an adjustable member for altering at will the setting of a thermostat from a normal temperature to a higher temperature; a pivoted arm having one position in which said arm is capable of engaging the adjustable member to return it to normal setting condition, and having another position; a time delay device engageable with the pivoted arm for causing the arm to move toward the said one position when it is in a position out of operative relation to the adjustable member; said time delay device including a dashpot and a spring urging the arm in a direction to move the adjustable member; means operating on the arm upon reaching a definite position for moving the arm into operative relation with the adjustable member, as well as to release the spring from the dashpot to permit the spring to move the arm to return the adjustable member to normal position; said timing device including a collar in driving relation with the arm; said arm moving means operating to disconnect the arm from the collar; and a second spring for returning the collar to an initial position upon disconnection of the arm from the dashpot.

8. The combination as set forth in claim 7, in which the means operating on the arm for moving it into operative position is a cam; and means for adjusting the position of the cam to determine the normal temperature setting.

9. The combination as set forth in claim 8, with the addition of control knobs respectively connected to the adjustable member and the arm for respectively moving the adjustable member to a temporary high setting, and the arm into cooperation with said collar.

10. The combination as set forth in claim 8, with the addition of control knobs respectively connected to the adjustable member and the arm for respectively moving the adjustable member to a temporary high setting, and the arm into cooperation with said collar; and means providing guides for the movement of the adjustable member and of the arm.

References Cited by the Examiner
UNITED STATES PATENTS

| | | | |
|---|---|---|---|
| 1,159,169 | 11/15 | Brown | 74—3.5 |
| 2,216,806 | 10/40 | Condit | 236—48 |
| 2,333,130 | 11/43 | Thomsen | 74—2 |
| 2,545,846 | 3/51 | Dunn | 137—624.11 |
| 2,562,147 | 7/51 | Kuwayama | 74—2 XR |
| 2,656,984 | 10/53 | Caparone | 236—102 |
| 2,689,006 | 9/54 | Lindsay | 74—3.54 |
| 2,817,973 | 12/57 | Glickman | 74—2 |
| 2,960,297 | 11/60 | Cotter et al. | 74—2 XR |
| 3,036,470 | 5/62 | Hauser et al. | 74—3.52 |

BROUGHTON G. DURHAM, *Primary Examiner.*

MILTON KAUFMAN, *Examiner.*